United States Patent [19]

Dolce et al.

[11] Patent Number: 4,511,527
[45] Date of Patent: Apr. 16, 1985

[54] ALKALI METAL SALTS OF CROSS-LINKED POLYMERIC MICROGELS AS NUCLEATING AGENTS FOR POLYETHYLENE TEREPHTHALATE MOLDING COMPOSITIONS AND METHOD FOR MOLDING

[75] Inventors: Thomas J. Dolce, Stirling, N.J.; Bheema R. Vijayendran, Louisville, Ky.

[73] Assignee: Celanese Corporation, New York, N.Y.

[21] Appl. No.: 449,886

[22] Filed: Dec. 16, 1982

[51] Int. Cl.³ ............................................. B29F 1/00
[52] U.S. Cl. .................................. 264/328.2; 525/176; 528/308.4
[58] Field of Search ..................... 264/328.2; 525/176; 528/308.1, 308.3, 308.4

[56] References Cited

U.S. PATENT DOCUMENTS

| 4,020,126 | 4/1977 | Gander et al. | 264/554 X |
| 4,152,495 | 5/1979 | Labar | 264/51 X |
| 4,322,335 | 3/1982 | Nield | 525/176 X |
| 4,397,986 | 8/1983 | Hornbaker | 525/176 X |
| 4,401,792 | 8/1983 | Axelrod et al. | 525/176 X |
| 4,404,161 | 9/1983 | Bier | 264/328.18 |

FOREIGN PATENT DOCUMENTS 2015013 9/1979 United Kingdom .

Primary Examiner—Donald Czaja
Assistant Examiner—V. Fischbach
Attorney, Agent, or Firm—Burns, Doane, Swecker & Mathis

[57] ABSTRACT

Disclosed are nucleating agents for polyethylene terephthalate molding compositions comprised of alkali metal salts of carboxylic acid-containing polymeric microgel particles which are prepared by polymerizing in aqueous emulsion a monomer mixture containing about 5 to 50 percent by weight of polymerizable carboxylic acid monomers, up to 10 percent of a multifunctional crosslinking monomer and one or more carboxyl-free relatively water insoluble polymerizable vinyl monomers.

20 Claims, No Drawings

ALKALI METAL SALTS OF CROSS-LINKED POLYMERIC MICROGELS AS NUCLEATING AGENTS FOR POLYETHYLENE TEREPHTHALATE MOLDING COMPOSITIONS AND METHOD FOR MOLDING

CROSS-REFERENCE TO RELATED APPLICATIONS

This application is related to commonly-assigned application Ser. No. 06/449,887, filed Dec. 16, 1982, of Chandrasen Gajria and Yehuda Ozari entitled "Water-Swellable Cross-linked Polymeric Microgel Particles and Aqueous Dispersions of Organic Film-Forming Resins Containing the Same".

BACKGROUND OF THE INVENTION

High molecular weight linear thermoplastic polyesters such as polyethylene terephthalate and poly(1,4-butylene terephthalate) are well known film, molded article and fiber formers. See, for example, U.S. Pat. Nos. 2,465,319 and 3,047,539. Polyethylene terephthalate has not been widely exploited as a molding and extrusion resin due to its unacceptably slow rate of crystallization. The prior art has overcome, to some extent, this problem by providing careful molecular weight control in the production of polyethylene terephthalate; by including nucleating agents to hasten crystallization; or by using unconventional, long, two-step molding cycles.

For example, U.K. patent application Ser. No. 2,015,013, published Sept. 5, 1979, discloses the use of a sodium or potassium salt of a selected organic polymer containing pendant carboxyl groups together with a selected low molecular weight organic ester of an aliphatic carboxylic acid. U.S. Pat. No. 4,212,791 discloses polyalkylene terephthalate molding compositions comprising an inert nucleating agent, an oligomeric polyester crystallization promoter and a segmented thermoplastic copolyester-ether elastomer. U.S. Pat. No. 3,843,615 discloses a thermoplastic molding composition comprise,d of a cross-linked polyester as a nucleating agent. U.S. Pat. No. 3,761,450 is directed to linear saturated polyester molding compositions containing lithium and/or sodium salts of polycarboxylic acids. U.S. Pat. No. 3,575,931 discloses polyethylene terephthalate molding compositions which contain a nucleating agent such as metal salts of carboxylic acids, metal salts of inorganic acids and highly polar organic compounds.

By way of contrast, poly(1,4-butylene terephthalate) resins crystallize very rapidly. These resins provide excellent molding compositions because they can be fabricated with moderate stock temperatures, low mold temperatures and rapid cycle times. Because of their highly crystalline nature, these resins exhibit desirable chemical resistance, thermal stability and product appearance (i.e., they exhibit a smooth, glossy finish). Such resins also exhibit superior strength, stiffness, low friction and wear properties and good resistance to brittle fracture. Because of their rapid crystallization times the poly(1,4-butylene terephthalate) resins do not normally require the presence of nucleating agents during the injection molding process. However, one disadvantage of the poly(1,4-butylene terephthalate) resins resides in their significantly higher cost of manufacture in comparison to polyethylene terephthalate.

It is therefore desirable from an economic point of view to substitute polyethylene terephthalate for polybutylene terephthalate. However, the crystallization rate of polyethylene terephthalate constitutes an impediment to such a substitution.

OBJECTS AND SUMMARY OF THE INVENTION

It is therefore an object of the present invention to provide a polyethylene terephthalate molding composition which exhibits desirable crystallization characteristics.

It is also an object of the present invention to provide a method by which an article can be molded by use of a polyethylene terephthalate resin molding composition whereby the resin crystallizes at an acceptable rate during the molding process.

In accordance with the present invention, there is thus provided a melt blend suitable for use as a thermoplastic molding composition comprised of polyethylene terephthalate and a nucleating agent in an amount sufficient to enhance the crystallization rate of the polyethylene terephthalate, said nucleating agent being comprised of an alkali metal salt of a cross-linked, aqueous emulsion polymerized copolymer comprising (1) at least one polymerizable vinyl monomer selected from the group consisting of carboxylic acid group-free polymerizable vinyl monomers and mixtures thereof in an amount sufficient to constitute a major portion of said copolymer; (2) from about 5 to 50 percent by weight, based on total monomer weight, of at least one polymerizable vinyl monomer selected from the group consisting of alpha, beta-ethylenically unsaturated carboxylic acid monomers and mixtures thereof, said carboxylic acid monomers being substantially non-gelling when copolymerized with said acid group-free monomers in an aqueous emulsion; and (3) up to about 10 percent by weight, based on total monomer weight of a multifunctional cross-linking monomer.

In accordance with the present invention, there is also provided a method for the production of a molded article, said method comprising (a) providing a melt processable composition comprised of polyethylene terephthalate and a nucleating agent present in an amount sufficient to enhance the crystallization rate of the polyethylene terephthalate, the nucleating agent being comprised of an alkali metal salt of a cross-linked, aqueous emulsion polymerized copolymer comprising (1) at least one polymerizable vinyl monomer selected from the group consisting of carboxylic acid group-free polymerizable vinyl monomers and mixtures thereof in an amount sufficient to constitute a major portion of said copolymer; (2) from about 5 to 50 percent by weight, based on total monomer weight, of at least one polymerizable vinyl monomer selected from the group consisting of alpha, beta-ethylenically unsaturated carboxylic acid monomers and mixtures thereof, said carboxylic acid monomers being substantially non-gelling when copolymerized with said acid group-free monomers in an aqueous emulsion; and (3) up to about 10 percent by weight, based on total monomer weight of a multifunctional cross-linking monomer, and (b) forming a shaped article by melt processing of said composition.

In accordance with the present invention there are also provided shaped articles produced by the above method.

DETAILED DESCRIPTION OF THE INVENTION

It has been discovered that molded articles can be satisfactorily provided from polyethylene terephthalate-based materials by use of the cross-linked polymeric microgel nucleating agents of the present invention.

A. The Polyethylene Terephthalate Resin

The polyethylene terephthalate resin which is employed in the present invention may be any conventional polyethylene terephthalate resin and may be prepared by conventional methods. See, for example, U.S. Pat. Nos. 2,465,319 and 3,047,539, each herein incorporated by reference.

Polyethylene terephthalate resins are characterized by an intrinsic viscosity of at least 0.2 and preferably about at least 0.4 dl./g. as measured by the relative viscosity of an 8 percent solution in orthochlorophenol at about 25° C. The upper limit is not critical but it generally does not exceed about 2.5 dl./g. Especially preferred polyethylene terephthalates are those with an intrinsic viscosity in the range of from about 0.4 to 1.3 dl./g.

B. The Microgel Nucleating Agent

As is well known to those skilled in the art, microgel particles comprise small particles of polymer gel which generally have a diameter in the micrometer range or less. Typically such particles have a size which ranges from about 0.05 to 200 microns in diameter.

The microgels employed in the present invention can broadly be described as the alkali metal salts of cross-linked particles of a copolymer containing as its essential monomeric components a small amount of a multifunctional cross-linking monomer, a polymerizable carboxylic acid monomer and one or more polymerizable, carboxyl-free, relatively water-insoluble vinyl monomers. The exact desired composition of the microgels can vary widely.

The microgel particles employed in the present invention comprise the alkali metal salt of the polymerization product of from about 5 to 50 percent based on the total monomer weight, of polymerizable carboxylic acid monomers, up to 10 percent, based on the total monomer weight, of a multifunctional (e.g., difunctional) crosslinking monomer; and one or more carboxyl-free, relatively water-insoluble polymerizable vinyl monomers, which form the balance or major portion of the polymerization product. Optionally, minor amounts of various other polymerizable monomers, which do not adversely effect the polymerization reaction and/or the performance of the microgel particles, may be substituted for a portion of the carboxyl-free, relatively water-insoluble polymerizable vinyl monomers.

Microgel formulations satisfying the foregoing requirements will typically comprise from about 5 to 50 percent, preferably from about 25 to 45 percent, and most preferably from about 30 to about 40 percent by total weight of the monomer mixture of the polymerizable carboxylic acid monomer; a small amount ranging up to about 10 percent, preferably from about 1 to about 3 percent by total weight of the monomer mixture of the multifunctional crosslinking monomer; and a major amount, frequently the balance of the microgel composition, of the relatively water-insoluble, carboxylic free polymerizable vinyl monomer.

The polymerizable carboxylic acid monomer comprises an alpha, beta ethylenically unsaturated carboxylic acid which is substantially non-gelling when polymerized in aqueous emulsion with the various other components of the microgel. As used herein, the term "substantially non-gelling" means that polymerization of the carboxylic acid monomer in aqueous emulsion does not produce a precipitated mass of non-particulate gel, but instead produces discrete polymer particles of microgel dimension. Carboxylic acid monomers polymerizable in aqueous emulsion without gelling are well known to those skilled in the art. Examples of such acids include methacrylic acid, crotonic acid, itaconic acid (or anhydride), maleic acid (or anhydride), fumaric acid, various other substituted acrylic acids wherein the hydrocarbyl substituent contains from 3 to 8 carbon atoms, and the monoesters of dicarboxylic acids such as methyl hydrogen maleate, ethyl hydrogen fumarate, and the like, of which methacrylic acid is particularly preferred. Acrylic acid itself is not preferred for use in the instant microgels since this acid produces undesirable non-particulate polymer gels during polymerization in aqueous emulsion. If desired, the polymerizable carboxylic acid component may include a small portion (e.g. 1 or 2 percent by weight) of acrylic acid or other gelling carboxylic acid monomer in an amount which does not substantially alter the non-gelling characteristics of the monomer mixture. It is preferred, however, that the carboxylic acid component comprise only non-gelling monomers such as methacrylic acid.

The second essential monomeric component of the microgel particles is the relatively water-insoluble, carboxyl-free polymerizable vinyl monomer. Suitable monomers of this class include those carboxyl-free vinyl monomers which are polymerizable in aqueous emulsion and which have a greater affinity for water-insoluble film-forming resins such as epoxy or phenolic resins than for an aqueous solvent medium. The carboxyl free vinyl monomer need not be completely water-insoluble. It is sufficient for the purposes of this invention if the vinyl monomer is sufficiently water-insoluble to produce water-dispersible polymers. Monomers satisfying this requirement are well known to those skilled in the art. Typical examples of such monomers include polymerizable vinyl aromatic monomers such as styrene, the o-, m- and p- alkyl or aryl styrenes wherein the substituent group has from about 1 to 8 carbon atoms such as o-methylstyrene, m-ethylstyrene, p-methyl styrene, p-tertbutylstyrene, the 2,4-, 2,5- and 3,4-dimethylstyrenes, 4-methoxystyrene, 4-phenylstyrene, 4-phenoxystyrene, 4-benzylstyrene, 2,6-dimethoxystyrene, 2,5-diethylstyrene, alpha-methylstyrene, 3,4-alpha-methyl styrene, halostyrenes such as 4-chlorostyrene, the 2,5-, 3,4- and 2,6-dichlorostyrenes, the corresponding fluorostyrenes, as well as any of the various other substituted styrenes which satisfy the various solubility and polymerizability requirements discussed above, vinyl toluene, isopropenyl toluene, and vinylnaphthalene; alkyl or aryl esters of the alpha, beta-ethylenically unsaturated carboxylic acids having from 1 to about 8 carbon atoms in the ester (alcohol) group, such as the methyl, ethyl, propyl, butyl, hexyl, ethylhexyl, phenyl and benzyl acrylates, methacrylates and crotonates; a dimethyl maleate; dibutylmaleate; dibutylfumarate; dihexylitaconate; nitrile monomers such as acrylonitrile and methacrylonitrile; vinyl halides such as vinyl chloride, vinyl bromide, etc.; vinyl esters such as vinyl acetate, vinyl propionate, vinyl stearate, vinyl butyrate, vinyl laurate, etc.; and mixtures thereof. Preferred monomers within the aforementioned class of materials include the various polymerizable vinyl aromatic monomers, methacrylate ester monomers, nitrile monomers and vinyl halide monomers described above; of which styrene and methyl methacrylate are particularly preferred.

Monomers within the aforementioned groups of carboxyl-free polymerizable vinyl monomers may be polymerized with the carboxylic acid monomer and the cross-linking monomer to form microgels having useful nucleating properties. Mixtures of two or more polymerizable carboxyl-free vinyl monomers may also be employed. Preferred mixtures of carboxyl-free vinyl monomers for use in the instant microgels comprise a substantial portion (i.e., more than half), based on the total amount of the carboxyl-free monomeric component present in the microgel, of one or more polymerizable vinyl aromatic monomers, methacrylate ester monomers, nitrile monomers, vinyl halide monomers or mixtures thereof with a lesser amount of one or more monomers selected from the class of vinyl ester monomers, alkyl acrylate monomers and mixtures thereof. In this embodiment, the vinyl ester monomer or alkyl acrylate monomer will typically comprise less than about 15 percent by weight, based on the total microgel weight of the microgel formulation. Examples of suitable carboxyl-free vinyl monomer mixtures which are particularly preferred for use herein include mixtures of styrene and/or methyl methacrylate with vinyl acetate and/or ethyl acrylate, such as styrene/vinyl acetate mixtures, styrene/ethyl acrylate mixtures, styrene/methyl methacrylate/vinyl acetate mixtures, styrene/methyl methacrylate/ethyl acrylate mixtures, etc.

The remaining essential component is the multifunctional crosslinking monomer. The cross-linking monomer is employed in an amount sufficient to crosslink the aqueous emulsion copolymer, thereby converting the copolymer to a nonlinear polymeric microgel. The microgels will typically contain up to about 10 percent by weight and preferably from about 1 to about 3 percent by weight of the multifunctional crosslinking monomer based on the total monomer weight. Illustrative of multifunctional (e.g., difunctional) crosslinking agents which may be used in the instant microgels are compounds such as ethylene glycol dimethacrylate, tetraethylene glycol dimethacrylate, methylene bisacrylamide, methylene bismethacrylamide, divinyl benzene, vinyl methacrylate, vinyl crotonate, vinyl acrylate, divinyl acetylene, trivinyl benzene, glycerine trimethylacrylate, pentaerythritol tetramethacrylate, triallyl cyanurate, divinyl ethane, divinyl sulfide, divinyl sulfone, hexatriene, triethylene glycol dimethacrylate, diallyl cyanamide, glycol diacrylate, ethylene glycol divinyl ether, diallyl phthalate, divinyl dimethyl silane and glycerol trivinyl ether, of which divinylbenzene is particularly preferred.

Microgel formulations which have been found to be particularly useful for use in the present invention comprise from about 5 to about 50 percent, preferably from about 25 to about 45 percent, and most preferably from about 30 to about 40 percent by weight of methacrylic acid or mixtures thereof with other alpha, beta ethylenically unsaturated carboxylic acid monomers; and up to about 10 percent, preferably from about 1 to 3 percent of divinylbenzene; with the balance of the microgel comprising carboxyl group free polymerizable vinyl monomers such as the polymerizable vinyl aromatic monomers, methacrylate ester monomers, nitrile monomers, vinyl halide monomers, and mixtures thereof with minor amounts (i.e., less than 50 percent by weight of the total carboxyl free vinyl monomer present) of vinyl ester monomers and alkyl acrylate monomers, all weights being based on the total monomer weight except where otherwise noted. Within this subgenus, microgels comprised of copolymers of methacrylic acid and divinylbenzene in the above-defined amounts; from about 10 to about 90 percent, preferably from about 35 to about 65 percent of styrene; from about 0 to about 50 percent, preferably from about 10 to about 30 percent of methyl methacrylate; and from about 0 to about 15 percent of ethyl acrylate and/or vinyl acetate are most preferred.

The microgel nucleant particles may be prepared by any conventional aqueous emulsion polymerization technique known to those skilled in the art. Suitable polymerization techniques of this type are described for example, in U.S. Pat. Nos. 3,492,252 and 4,139,514, the entirety of each being herein incorporated by reference. Typically, the microgel particles are prepared by emulsifying the three monomeric components together with a water soluble polymerization catalyst, in water with a suitable emulsifier for the monomers, and then heating the resulting aqueous emulsion at a temperature of from about 30° C. to about 95° C., preferably from about 50° C. to about 80° C., in a reactor with stirring for a time of from about one to about four hours until the polymerization reaction is substantially complete. The ratio of monomer to aqueous media is determined in order to provide a polymer emulsion having a solids content of from about 10 to about 45 percent, and preferably from about 20 to about 40 percent by weight.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomers as polymerization proceeds. An advantage of the gradual addition of monomers lies in reaching a high solids content with optimum control and with maximum uniformity of product. Additional catalysts may also be added as polymerization proceeds.

Typically emulsifiers which may be employed include any of the conventional emulsifiers utilized in aqueous emulsion polymerizations such as the alkyl salts of various hydrocarbon sulfates and sulfonates such as sodium lauryl sulfate and sodium dodecylbenzene sulfonate, alkylphenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene-linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long-chain carboxylic acids, such as lauric, myristic, palmitic, oleic, and the like or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc.

The amounts of emulsifier or emulsifiers required vary primarily with the concentration of monomers to be handled and to a minor extent with choice of emulsifier, monomers, and proportions of monomer. Generally, the amount of emulsifying agent is between 2 and 12 percent of the weight of the mixture of monomers and is preferably 4 percent to 7 percent of this weight. If the emulsion is to contain a relatively low concentration of microgel, somewhat less than minimum emulsifying agent indicated by the above rule may prove desirable. In such case the concentration of emulsifying agent in the aqueous emulsion may desirably be at least 1 percent of the emulsion and may be as much as about 7 percent of the weight of the aqueous emulsion.

The polymerization catalyst likewise may comprise any of the water soluble emulsion polymerization catalysts known to those skilled in the art. The concentration of the catalyst may vary from 0.01 to 3 weight percent based on the weight of monomers charged; it is preferably from 0.05 to 2 weight percent and most preferably from 0.1 to 1 weight percent. The particular concentration used in any instance will depend upon the specific monomer mixture undergoing reaction and the specific catalyst employed; these facts are known to those skilled in the art. It is also possible that traces of metal ions can be added as activators to improve the rate of polymerization, if desired. Exemplary catalysts include hydrogen peroxide, peracetic acid, t-butyl hydroperoxide, di-t-butyl hydroperoxide, dibenzoyl peroxide, benzoyl hydroperoxide, 2,4-dichlorobenxoyl peroxide, 2,5-dimethyl-2,5-bis(hydroperoxy) hexane, perbenzoic acid, t-butyl peroxypivalate, t-butyl peracetate, dilauroyl peroxide, dicapryloyl peroxide, distearoyl peroxide, diisopropyl peroxydicarbonate, didecyl peroxydicarbonate, dieicosyl peroxydicarbonate, di-t-butyl perbenzoate, 2,2-azobis-2,4-dimethylvaleronitrile, ammonium persulfate, potassium persulfate, sodium persulfate, sodium perphosphate, azobisisobutyronitrile, as well as any of the other known catalysts. Also useful are the redox catalyst systems such as sodium persulfate-sodium formaldehyde sulfoxylate, cumene hydroperoxide-sodium metabisulfite, hydrogen peroxide-ascorbic acid, and the other known redox systems.

A chain transfer agent may optionally be present during the polymerization reaction at a concentration of up to about 5 weight percent. The preferred chain transfer agents are those that are relatively water-soluble since they are more effective in the aqueous polymerization system than are those that are water-insoluble. Illustrative of such materials are the known alkyl and aryl mercaptans such as the essentially water soluble butyl mercaptans, mercaptoacetic acid, mercaptoethanol, 3-mercapto-1,2-propanediol and 2-methyl-2-propanethiol. Many water insoluble mercaptans can also be used, such as t-dodecyl mercaptan, phenyl mercaptan, pentaerythritol tetramercaptopropionate, octyldecyl mercaptan, tetradecyl mercaptan. If a chain transfer agent is employed, it is preferred that only small amounts within the aforementioned range be utilized in order to minimize the inhibitory effect of these materials on the formation of high molecular weight microgel particles.

Upon completion of the polymerization reaction, the emulsion has an appearance similar to a polymeric latex. The microgels have number average molecular weights ranging from about 100,000 to about 1,000,000 or greater.

The resulting microgel is then treated to neutralize the carboxylic acid moiety and provide the alkali metal salt thereof. Specifically, the neutralization may be accomplished by contacting the microgel with an alkali metal hydroxide (e.g., sodium hydroxide) in an amount sufficient to neutralize the carboxylic acid moiety. The microgel may then be recovered by drying the emulsion in an oven with the dried microgel being powdered to provide a particulate microgel suitable for use as a polymeric nucleating agent. The sodium salt of the microgel is the preferred nucleating agent for use in the present invention.

A surprising and unexpected aspect of the present invention is the fact that the alkali metal salts of the polymeric microgels described above exhibit greater nucleating ability when employed in polyethylene terephthalate molding compositions than do the acid analog and the ammonium salt of the microgel. This aspect is clearly demonstrated in the examples.

The nucleating agent is employed in an amount sufficient to enhance the crystallization rate of the polyethylene terephthalate and will generally be present in an amount ranging from about 0.4 to about 3 percent by weight based on the weight of the molding composition. It is well known that the general effectiveness of a nucleating agent may be dependent to a certain extent upon the temperature of the mold employed during melt processing (e.g., an injection mold). As such, an amount of nucleating agent should desirably be employed which is sufficient to enable a molded article to be formed which exhibits the desired physical properties (e.g., satisfactory surface appearance, heat deflection temperature, etc.). Preferably, sufficient nucleating agent is employed to provide a molded article which exhibits a minimum heat deflection temperature (an indication of the degree of crystallization) of at least about 190° C. at a mold temperature of 70° C. as determined by ASTM D648. Such articles also desirably exhibit a minimum heat deflection temperature of at least about 215° C. at a mold temperature of 100° C. Of course, a molded article which exhibits the desirable heat deflection temperature at a mold temperature of 70° C. will also as a matter of course exhibit satisfactory heat deflection temperatures when higher mold temperatures are employed (e.g., 100° C.).

The molding composition of the present invention comprises polyethylene terephthalate and the nucleating agent and optionally various fillers, reinforcing agents, flame retardants, plasticizers, impact modifiers, stabilizers, and melt drip suppressants as deemed desirable. Suitable fillers and reinforcing agents are disclosed in U.S. Pat. No. 3,751,396, herein incorporated by reference.

Articles may be molded from a molding compound which includes approximately 1 to 50 percent and preferably approximately 10 to 30 percent by weight, based upon the total weight of the molded compound, of a solid filler and/or reinforcing agent. Representative fibers which may serve as reinforcing media include glass fibers, asbestos, graphitic carbon fibers, amorphous carbon fibers, synthetic polymeric fibers, aluminum fibers, aluminum silicate fibers, aluminum oxide fibers, titanium fibers, magnesium fibers, rock wool fibers, steel fibers, tungsten fibers, cotton, wool, and wood cellulose fibers, etc. Representative filler materials include calcium silicate, silica, clays, talc, mica, polytetrafluoroethylene, graphite, alumina trihydrate, sodium aluminum carbonate, barium ferrite, etc.

The use of flame-retardants in polymeric molding resins is known to those skilled in the art. See, for example, U.S. Pat. No. 3,671,487, herein incorporated by reference, for a more detailed disussion of useful flame retardants. Preferred flame retardants include halogenated organic compounds wherein the halogen is bromine or chlorine. Antimony-, nitrogen- and phosphorous-containing compounds are also useful as flame retardants.

The molding composition may also comprise minor amounts of polybutylene terephthalate. For example, the molding composition may comprise from about 0 to 40 percent by weight of polybutylene terephthalate and from about 100 to 60 percent by weight of polyethylene terephthalate.

The molding composition may also include a mold release agent present in a concentration of from about 0.05 to 10 percent by weight, based on the total weight of the composition. More preferably, the mold release agent is present in a concentration in the range of between about 0.05 and 2 percent by weight based on the total weight of the composition. In a preferred embodiment, the mold release agent is N,N'-distearoylethylenediamine.

A plasticizer may also be present in the resin composition in a concentration of between about 0.1 and 20 percent by weight based on the total weight of the composition to enhance the surface appearance of the molded article. A preferred plasticizer for use in the resin composition is neopentylglycol dibenzoate.

Non-dripping embodiments are provided if the flame retardant compositions also include conventional agents such as a polytetrafluoroethylene resin or a fumed colloidal silica in a minor proportion based on the composition but in an amount at least sufficient to render said polyester resin non-dripping when burning.

In order to form an article by molding from the present blend, or from a molding compound made from the present blend, the blend or molding compound is brought to the melt temperature of the blend, e.g., approximately 280° C. to 300° C., and is then molded by suitable means such as being injected into a mold cavity. The mold cavity is commonly maintained at a temperature less than approximately 100° C., e.g., approximately 90° C. to 100° C. The blend in its melt phase is injected into the mold cavity at a pressure of approximately 10,000 p.s.i. The cycle time (i.e., the time between injections) for the present blend commonly is about 10 to 40 seconds. Other molding processes may be employed as the invention is not limited to the use of injection molding.

It has been observed that the properties of articles formed from the blend of the present invention vary with the processing conditions, such as mold temperature, pressure, cycle time, etc. However, it would be obvious to one of ordinary skill in the art to experimentally determine those conditions which maximize the properties of articles formed from the present blend.

The invention is additionally illustrated in connection with the following Examples which are to be considered as illustrative of the present invention. It should be understood, however, that the invention is not limited to the specific details of the Examples.

EXAMPLE 1

A sodium salt of a cross-linked polymeric microgel comprised of about 59 percent by weight of styrene, about 35 percent by weight of methacrylic acid, about 6 percent by weight of vinyl acetate and about 1 percent by weight of divinyl benzene was produced by the following method.

To a suitable polymerization reactor equipped with a stirrer, reflux condenser, thermometer, and an inlet for nitrogen gas were added 1624 grams of water, 11.4 grams of Siponate DS-10 (a sodium dodecyl benzene sulfonate surfactant available from Alcolac, Inc.), and 7.4 grams of n-butanol. The mixture was stirred and nitrogen flow started. The following monomer formulation was then added: 284 grams of styrene, 169 grams of methacrylic acid, 29 grams of vinyl acetate, and 10 grams of divinyl benzene (55% active, available from American Hoechst). The polymerization mixture was heated to 60° C. and one round of the following initiators were added: 1.9 grams of a 10% aqueous ammonium persulfate solution, 2.3 grams of a 0.1% ferrous sulfate solution and 2.5 grams of a 10% sodium hydrosulfite solution. The temperature was maintained at 65° C., and after 30 minutes another round of initiators was added as before. Polymerization continued for another hour to ensure complete monomer conversion. The pH of the emulsion was 2.7. The emulsion was diluted to 10 percent solids and neutralized with sodium hydroxide to a pH of 9. The emulsion in the form of the sodium salt was dried overnight in an oven at 85° C. and then ground for use as a nucleating agent.

The particulate microgel nucleating agent was admixed with polyethylene terephthalate in amounts of 0.4 and 1.0 percent by weight together with 31 percent by weight of glass fibers and 3.0 percent by weight of neopentyl glycol dibenzoate as a plasticizer. The admixture was then formed into a molded article by injection molding at mold temperatures of 70° C. and 100° C. The heat deflection temperature (for all samples) and crystallization rate for the admixture (for the 70° C. sample) were determined and set forth in Table I below.

COMPARATIVE EXAMPLE

The procedure of the Example 1 was repeated with the exception that the nucleating agent was either the acid analog of the cross-linked polymeric microgel, the ammonium salt of the cross-linked polymeric microgel or sodium bicarbonate. The ammonium salt of the microgel was obtained in a manner similar to that employed to form the sodium salt with the exception that the neutralization was accomplished with ammonium hydroxide. The acid analog was obtained by drying the latex emulsion as prepared at a pH of 2.7. The heat deflection temperature and crystallization times for the injection molded samples were determined and also set forth in Table I below.

TABLE I

| | Effectiveness of Various Nucleating Agents | | | |
|---|---|---|---|---|
| | | Heat Deflection Temperature | | Crystallization |
| Nucleant | Percent by wt. | 70° C. Mold | 100° C. Mold | Time (min) 70° C. Mold |
| Sodium Salt Microgel | 0.4 | 74 | 215 | 1.45 |
| Acid Analog Microgel | 0.4 | 66 | 88 | 1.78 |
| Ammonium Salt Microgel | 0.4 | 71 | 79 | 1.45 |
| Sodium Bicarbonate | 0.4 | 223 | 224 | 1.00 |
| Sodium Salt Microgel | 1.0 | 219 | 224 | 0.78 |

TABLE I-continued

Effectiveness of Various Nucleating Agents

| Nucleant | Percent by wt. | Heat Deflection Temperature 70° C. Mold | Heat Deflection Temperature 100° C. Mold | Crystallization Time (min) 70° C. Mold |
| --- | --- | --- | --- | --- |
| Acid Analog Microgel | 1.0 | 67 | 74 | 1.45 |
| Ammonium Salt Microgel | 1.0 | 67 | 81 | 1.66 |

The data in Table I above demonstrates the advantages provided by the use of the nucleating agents of the present invention. Specifically, the nucleating activity of the alkali metal salt derivative of the microgels exceeds that of the acid analog and ammonium salt of the microgels at a mold temperature of 70° C. at concentrations of 0.4 and 1.0 percent by weight with the activity of the alkali metal salt derivative being significantly greater at higher concentrations. The crystallization time of the molding composition is also satisfactorily reduced in each instance for the alkali metal salt derivative. The distinctions which exist over the acid analog and ammonium salt derivative become more apparent at a mold temperature of 100° C. The heat deflection temperatures and crystallization temperatures exhibited by the molding composition of the present invention compare favorably with those exhibited by a molding composition which contains sodium bicarbonate as a conventional nucleating agent.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A melt blend suitable for use as a thermoplastic molding composition comprised of polyethylene terephthalate and a nucleating agent in an amount sufficient to enhance the crystallization of the polyethylene terephthalate, the nucleating agent being comprised of an alkali metal salt of a cross-linked, aqueous emulsion-polymerized copolymer comprising (1) at least one polymerizable vinyl monomer selected from the group consisting of carboxylic acid group-free polymerizable vinyl monomers and mixtures thereof in an amount sufficient to constitute a major portion of said copolymer; (2) from about 5 to less than 50 percent by weight, based on total monomer weight, of at least one polymerizable vinyl monomer selected from the group consisting of alpha, beta-ethylenically unsaturated carboxylic acid monomers and mixtures thereof, said carboxylic acid monomers being substantially non-gelling when copolymerized with said acid group-free monomers in an aqueous emulsion; and (3) up to about 10 percent by weight, based on total monomer weight of a multifunctional cross-linking monomer; and wherein said nucleating agent is present in an amount sufficient to enable a molded article produced from a melt blend containing 31 weight percent glass fibers to exhibit a heat deflection temperature of at least about 190° C. at a mold temperature of 70° C. as determined by ASTM D648.

2. The melt blend of claim 1 wherein said alkali metal salt is a sodium salt.

3. The melt blend of claim 1 wherein said nucleating agent is present in an amount ranging from about 0.4 to 3 percent by weight.

4. The melt blend of claim 1 wherein said copolymer comprises the addition copolymerization product of methacrylic acid, styrene and vinyl acetate.

5. The melt blend of claim 4 wherein said copolymer further comprises divinylbenzene.

6. The melt blend of claim 5 wherein (2) of said copolymer comprises from about 5 to less than 50 percent by weight of methacrylic acid, and wherein (1) of said microgel comprises from about 10 to 90 percent by weight of styrene and up to 50 percent by weight of vinyl acetate.

7. The melt blend of claim 6 wherein (1) of said copolymer comprises from about 35 to 65 percent by weight of styrene.

8. A method for the production of a molded article comprising
    (a) providing a melt blend comprised of polyethylene terephthalate and a nucleating agent in an amount sufficient to enhance the crystallization rate of the polyethylene terephthalate and to enable a molded article produced from a melt blend containing 31 weight percent glass fibers to exhibit a heat deflection temperature of at least about 190° C. at a mold temperature of 70° C. as determined by ASTM D648, the nucleating agent being comprised of an alkali metal salt of a cross-linked, aqueous emulsion-polymerized copolymer comprising (1) at least one polymerizable vinyl monomer selected from the group consisting of carboxylic acid group-free polymerizable vinyl monomers and mixtures thereof in an amount sufficient to constitute a major portion of said copolymer; (2) from about 5 to less than 50 percent by weight, based on total monomer weight, of at least one polymerizable vinyl monomer selected from the group consisting of alpha, beta-ethylenically unsaturated carboxylic acid monomers and mixtures thereof, said carboxylic acid monomers being substantially non-gelling when copolymerized with said acid group-free monomers in an aqueous emulsion; and (3) up to about 10 percent by weight, based on total monomer weight of a multifunctional cross-linking monomer, and
    (b) forming a shaped article by melt processing of said blend.

9. The method of claim 8 wherein said alkali metal salt is a sodium salt.

10. The method of claim 8 wherein said nucleating agent is present in an amount ranging from about 0.4 to 3 percent by weight.

11. The method of claim 8 wherein said copolymer comprises the addition copolymerization product of methacrylic acid, styrene and vinyl acetate.

12. The method of claim 11 wherein said copolymer further comprises divinylbenzene.

13. The method of claim 11 wherein (2) of said copolymer comprises from about 5 to less than 50 percent by weight of methacrylic acid, and wherein (1) of said microgel comprises from about 10 to 90 percent by styrene and up to 50 percent by weight of vinyl acetate.

14. The method of claim 13 wherein said (1) of said copolymer comprises from about 35 to 65 percent by weight of styrene.

15. The method of claim 8 wherein said molded article is formed by injection molding.

16. The method of claim 8 which comprises providing a melt blend comprised of a plasticizer at a concentration of between about 0.1 and 20 percent by weight based on the total weight of the melt blend.

17. The method of claim 8 which comprises providing the nucleating agent in the form of microgel particles having sizes within a range from about 0.05 to 200 microns in diameter.

18. A method for the production of a molded article, comprising the step of forming a shaped article by melt processing of a melt blend prepared in accordance with claim 1.

19. A melt blend suitable for use as a thermoplastic molding composition comprising polyethylene terephthalate and a nucleating agent in an amount sufficient to enhance crystallization of the polyethylene terephthalate, said nucleating agent being an alkali metal salt of a cross-linked, aqueous emulsion-polymerized copolymer comprising (1) an amount of styrene sufficient to constitute a major portion of said copolymer, (2) less than 15 weight percent of vinyl acetate, based on total monomer weight, (3) from about 5 to less than 50 weight percent, based on total monomer weight, of methacrylic acid, and (4) up to about 10 weight percent of divinylbenzene, based on total monomer weight, where said nucleating agent is present in an amount sufficient to enable a molded article produced from a melt blend containing 31 weight percent glass fibers to exhibit a heat deflection temperature of at least about 190° C. at a mold temperature of 70° C. as determined by ASTM D648.

20. A method for the production of a molded article, comprising the step of forming a shaped article by melt processing of a melt blend prepared in accordance with claim 19.

* * * * *